United States Patent [19]

Iida et al.

[11] 4,332,171

[45] Jun. 1, 1982

[54] ULTRASONIC DIAGNOSIS APPARATUS

[75] Inventors: Taketoshi Iida; Kazuyoshi Saito; Toshio Shrasaka; Yasuhiko Takemura, all of Tochigi, Japan

[73] Assignee: Tokyo Shibaura Denki Kabushiki Kaisha, Kawasaki, Japan

[21] Appl. No.: 165,622

[22] Filed: Jul. 3, 1980

[30] Foreign Application Priority Data

Jul. 11, 1979 [JP] Japan .................................. 54-86866

[51] Int. Cl.³ ............................................ G01N 29/00
[52] U.S. Cl. ...................................................... 73/626
[58] Field of Search ................. 73/626, 625, 628, 641; 128/660; 367/105, 117, 122

[56] References Cited

U.S. PATENT DOCUMENTS

| 4,064,741 | 12/1977 | Reynolds ............................. 73/626 |
| 4,140,022 | 2/1979 | Maslak . |
| 4,161,122 | 7/1979 | Buchner ............................. 73/626 |
| 4,241,610 | 12/1980 | Anderson ........................... 73/626 |
| 4,254,662 | 3/1981 | Kunoda et al. .................... 73/626 |

FOREIGN PATENT DOCUMENTS

| 2628492 | 5/1977 | Fed. Rep. of Germany . |
| 2654280 | 6/1977 | Fed. Rep. of Germany . |
| 52-68755 | 6/1977 | Japan . |
| 53-1981 | 1/1978 | Japan . |
| 53-32987 | 3/1978 | Japan . |
| 1480287 | 7/1977 | United Kingdom . |
| 1570879 | 7/1980 | United Kingdom . |

OTHER PUBLICATIONS

European Search Report regarding EP/80103830.8 and dated 11-02-81.

Primary Examiner—Stephen A. Kreitman
Attorney, Agent, or Firm—Finnegan, Henderson, Farabow, Garrett & Dunner

[57] ABSTRACT

An ultrasonic diagnosis apparatus is provided with a plurality of phased array transducer elements arranged in a row. The number of simultaneously driven transducer elements is changed in response to a rate pulse to increase the ultrasonic scanning line density without increasing the number of the transducer elements, while the position of the focal point is adjusted to maintain the minimum width position of the ultrasonic beam provided by the group of the simultaneously driven transducer elements substantially constant irrespective of the change of the number of the simultaneously driven transducer elements by controlling the phase of transmitted and received ultrasonic waves by means of delay elements.

5 Claims, 6 Drawing Figures

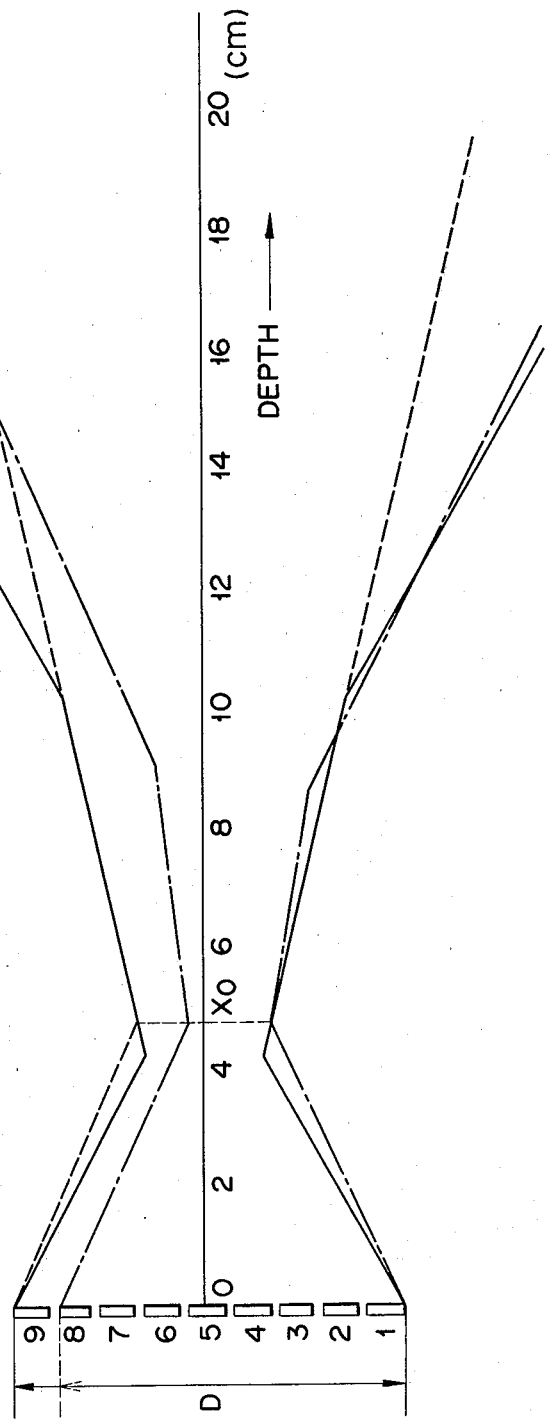

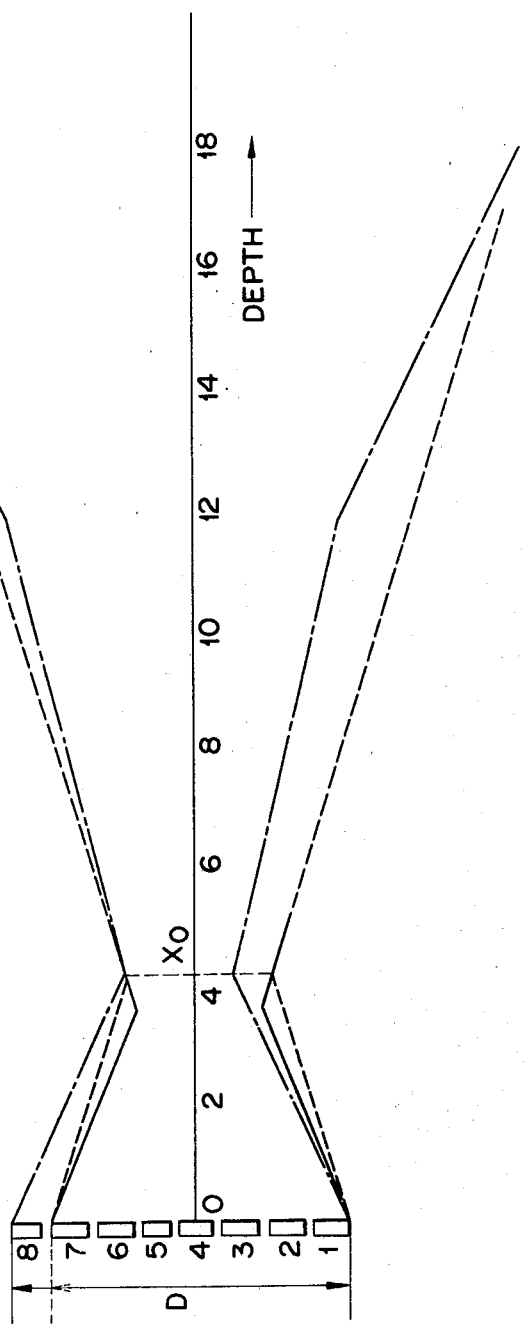

ULTRASONIC DIAGNOSIS APPARATUS

This invention relates to an ultrasonic diagnosis apparatus having an ultrasonic probe including a plurality of transducer elements arranged in a row, in which the number of transducer elements driven at the same time is changed or switched for every predetermined period of time to thereby improve the ultrasonic scanning line density while also correction of the focal point of the ultrasonic scanning beam is effected simultaneously with the switching of the number of transducer elements through the control of the phase of the ultrasonic wave from a predetermined transducer element.

In a conventional ultrasonic diagnosis apparatus of the afore-mentioned type, having a probe including a plurality of transducer elements arranged in a row, if it is designed such that a predetermined number of transducer elements are simultaneously driven for transmission and reception of ultrasonic waves, the driving is progressively shifted by one element after another, i.e., by a pitch corresponding to the center-to-center distance between adjacent elements. For every repetition period, the center of directivity is shifted one element pitch after another. This means that the ultrasonic scanning line density is determined by the center-to-center distance between adjacent transducer elements. In this case, a probe including a large number of transducer elements having a small width so that the center-to-center distance between adjacent elements is as small as possible is required for increasing the ultrasonic scanning line density. The manufacture of such a probe, however, encounters various problems, and also increasing the number of transducer elements in the probe is likely to increase the size of the apparatus, making the apparatus more difficult to handle and increasing the cost of the apparatus.

In order to overcome the above drawbacks inherent in the prior art, it has been proposed to change or switch the number of simultaneously driven transducer elements for every repetition period so as to shift the center of directivity one-half the center-to-center distance between adjacent elements after another. FIG. 1 illustrates this method, wherein the number of transducer elements simultaneously driven for transmission and reception of waves is changed by one, more particularly alternately switched between three and four, for every signal pulse. By alternately switching the number of the simultaneously driven transducer elements between m and (m+1), the center of directivity of the group of the simultaneously driven transducer elements can be shifted by one-half the center-to-center distance between adjacent elements after another. Thus, it is possible to obtain a tomogram of double the ultrasonic scanning density with the same number of transducer elements.

Further, it has been proposed to reduce the pitch of shift to one-fourth the center-to-center distance between adjacent transducer elements by permitting three transducer elements to be used at the time of transmission and three elements at the time of reception for one pulse and permitting three elements to be used at the time of transmission and four elements at the time of reception for the next pulse.

However, with the afore-mentioned method of increasing the scanning line density, i.e., reducing the scanning line pitch, without varying the transducer element pitch, every time when the ultrasonic wave transmission is made, the aperture of the ultrasonic wave for transmission or reception is changed in accordance with the number of simultaneously driven transducer elements, so that the pattern of the ultrasonic beam transmitted or received is changed every time when transducer elements are driven.

The beam pattern with the change of the wave transmission or reception aperture will now be described in detail.

Generally, the ultrasonic beam pattern is determined by such factors as the aperture D of the group of simultaneously driven transducer elements, the wavelength $\lambda$ of the ultrasonic wave and the focal point F of the ultrasonic wave.

In case that $F < D^2/4$, the beam pattern, as described in "Diagrammatical approximation Method of Obtaining the Width of Ultrasonic Beam from Concave Surface Transducer" (by Iinuma et al., a lecture treatise given in the Nihon Ultrasonic Medical Association, November 1973), is shown in FIG. 2 wherein the diagrammatical method is applicable because the phased array transducer elements may be substantially considered as the equivalent of the concave surface transducer by controlling the phase of the transducer elements. In the Figure, labeled $X_0$ is the distance of a point of the minimum beam width, the distance being measured in the direction of the diagnosis depth, i.e., measured from the point of wave transmission. Denoting the wave transmission aperture at this time by D and the focal point by F, then the distance $X_0$ is given as $$X_0 = 1/(1/F + 2\lambda/D^2) \quad (1)$$

It will be seen that by the variation of the aperture D in accordance with the number of the simultaneously driven transducer elements, the aperture D causes the value of $X_0$ in equation (1) to be fluctuated. Since the value of $X_0$ is changed by the number of the simultaneously driven transducer elements for every repetition pulse (i.e., every time when the ultrasonic wave is transmitted), the point of reflection of the echo signal provided by the narrow beam is varied for every repetition pulse, so that the uniformity of the directional resolution is hampered to deteriorate the resolution of the tomogram.

For example, where the transducer element pitch is 1.5 mm, the wavelength of the ultrasonic wave is 0.64 mm (with the frequency being 2.4 MHz and the velocity of sound being 1,530 m/sec.), the distance of the focal point in the direction of wave transmission is 50 mm and the number of the simultaneously driven transducer elements is alternately switched between eight and seven, the error of the value of $X_0$ is about 10%.

Such variation of the value of $X_0$ with the afore-mentioned change of the beam pattern will cause pronounced deterioration of the resolution.

An object of the invention is to overcome the afore-mentioned drawback of the conventional ultrasonic diagnosis apparatus, in which the number of the simultaneously driven transducer elements is changed for every repetition pulse or every predetermined period, and which has a function of effecting the correction of the focal point of the transmitted ultrasonic beam every time when the beam is transmitted.

According to the invention, when the aforementioned aperture D in equation (1) is changed by the number of the simultaneously driven transducer elements, the focal point F is simultaneously shifted to maintain the minimum width position of the ultrasonic beam (i.e., the distance $X_0$ of the point) unchanged.

This invention can be more fully understood from the following detailed description, taken in conjunction with the accompanying drawings, in which:

FIGS. 3 and 4 are views showing ultrasonic beam patterns for illustrating the operational principles underlying the invention;

First, the operational principles underlying the invention will now be discussed with reference to FIGS. 3 and 4.

FIG. 3 shows beam patterns obtained by the aforementioned approximation method in case of a transducer element pitch of 1.5 mm, a wavelength of the ultrasonic wave of 0.64 mm (the frequency of the wave being 2.4 MHz and the velocity of the ultrasonic wave being 1,530 m/sec.), a focal point distance of 60 mm. When eight reference transducer elements are simultaneously driven, the beam pattern shown by broken lines is obtained. A beam pattern obtained by changing the number of the simultaneously driven transducer elements, i.e., by simultaneously driving nine transducer elements, in the next period without effecting the correction of the focal point is shown by solid lines.

It will be seen that the aparture D of the driven elements is changed in accordance with the number of the simultaneously driven transducer elements so that the minimum beam width position is varied if the correction thereof is not applied (i.e., the value of $X_0$). Accordingly, it is necessary to make the minimum beam width position (i.e., the value of $X_0$) displaced, when nine transducer elements are simultaneously driven, to coincide with the position when simultaneously driving eight elements by correcting the focal point through control of the delay time in each of these elements. In FIG. 4, a beam pattern in a case that eight elements are simultaneously driven as reference elements is shown by broken lines and a beam pattern in a case that the number of the simultaneously driven elements is reduced by one, i.e., seven elements are simultaneously driven in the next time, is shown by solid lines. Again in this driving manner, it is necessary to correct the focal point so as to make the value of $X_0$ coincide, which is similar to the above-mentioned driving manner of increasing the number of the simultaneously driven elements by one for the next period.

Meanwhile, it is well known that the width of the beam may be generally reduced over depth in a wide diagnostic field by setting $$F = D^2/4\lambda. \tag{2}$$

In this case, the position F of the focal point is also changed in accordance with the aparture which depends on the number of the simultaneously driven transducer elements, so that similar correction is required here again.

A principle of the invention will now be described.

Figure 1:
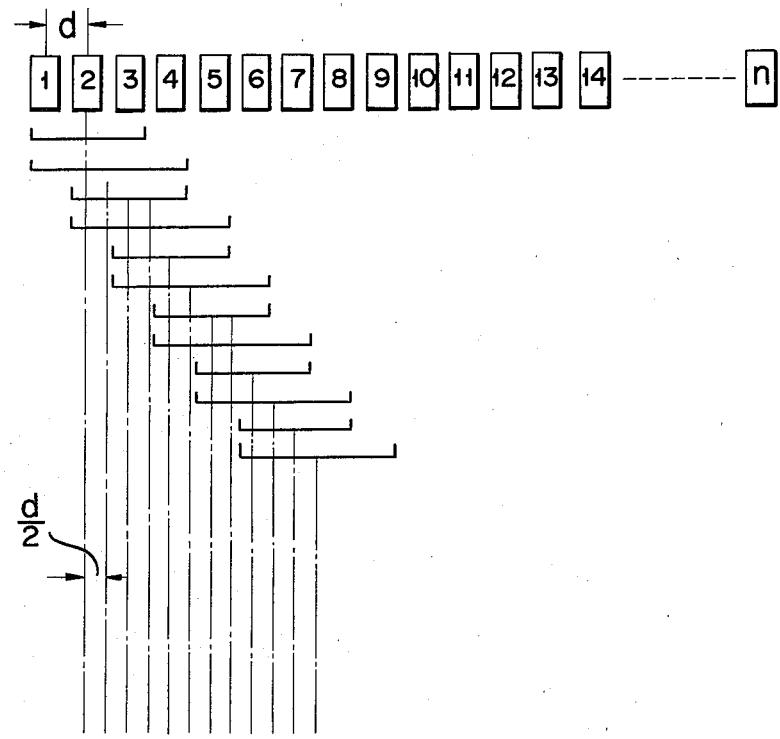
FIG. 1 is a view illustrating a conventional method of driving transducer elements in such a manner as to improve the scanning line density.
Figure 5:
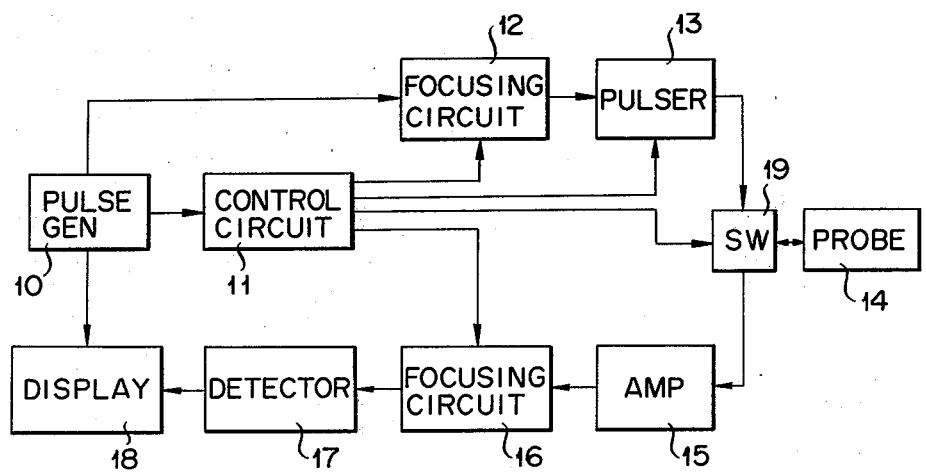
FIG. 5 is a block diagram showing an embodiment of the invention.
Figure 2:
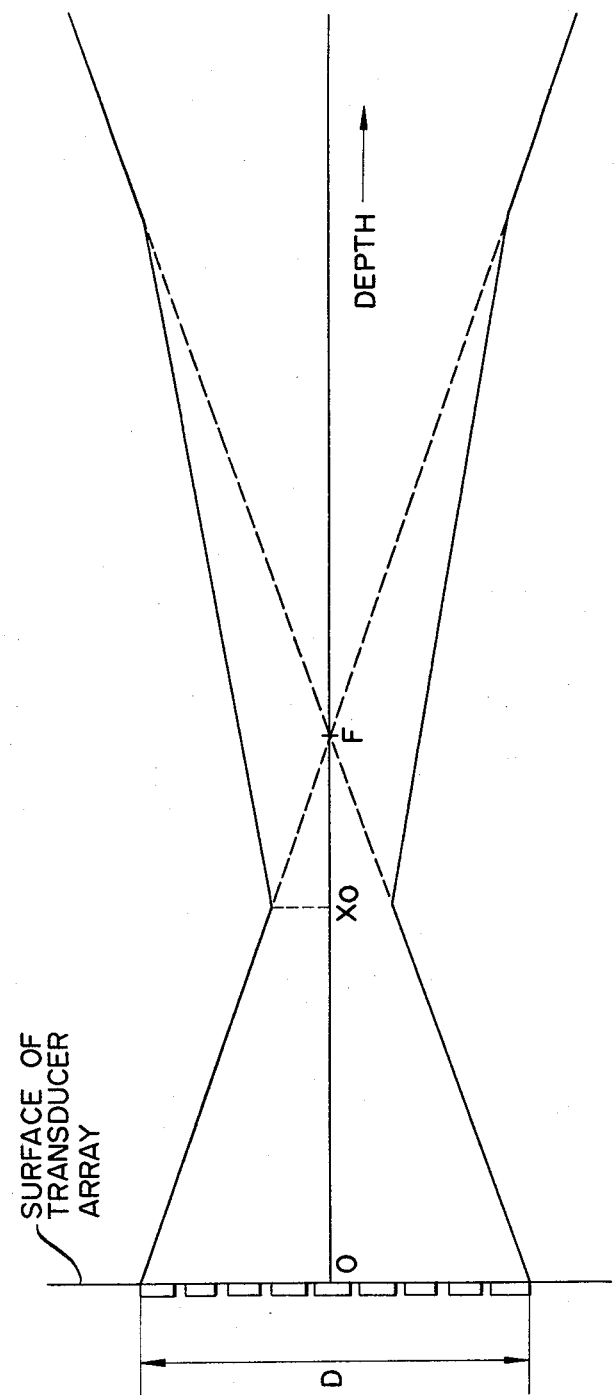
FIG. 2 is a view showing an ultrasonic beam pattern produced from a transducer element group in a row of transducer elements.

Referring now to FIG. 5, a preferred embodiment of the present invention includes a system pulse generator 10 which produces a reference pulse for a control circuit 11, a rate pulse for an electronic focusing circuit 12 and a synchronization pulse for a display device 18. The control circuit 11 provides a pulser 13 and a switching circuit 19 with enabling signals to control the number of simultaneously driven transducer elements in a probe 14. The control circuit 11 also provides electronic focusing circuits 12 and 16 with delay-time control signals so as to correct the focal point of ultrasonic beams which the simultaneously driven transducer elements transmit toward and receive from an object under examination. The focusing circuits 12 and 16 include delay line elements, each of which has a plurality of taps, and switching circuits serve to switch the taps of each delay line element in response to the delay-time control signals from the control circuit 11. The switching circuit 19 functions as a transmission and reception switch. The pulser 13 supplies driving pulses to the transducer elements in the probe 14 through the switching circuit 19. An amplifier 15 amplifies the received signal which is supplied from the probe 14 through the switching circuit 19. An output of the amplifier 15 is supplied to the electronic focusing circuit 16. A detector 17 derives an ultrasonic image signal from an output of the amplifier 15, which, in turn, is provided to the display device 18 as a brightness modulation signal. Receiving the synchronization signal from the pulse generator 10 and the brightness modulation signal from the detector 17, the display device 18 displays a B-mode (tomogram) image of the object under examination.

The operation of this apparatus will now be described. Upon reception of every rate pulse from the system pulse generator 10, the control circuit 11 provides the focusing circuits 12 and 16 with a delay-time control signal to make the focal point of the ultrasonic beam, namely the position of the minimum ultrasonic beam width, unchanged irrespective of the chage of the number of the simultaneously driven transducer elements and the pulser 13 and the switching circuit 19 with enabling signals for respectively controlling the number of the simultaneously driven transducer elements and the operation of transmission and reception.

Where the same number of transducer elements are driven both at the time of the transmission and reception, the focal point is controlled to be the same for both transmission and reception. Where different numbers of transducer elements are used for transmission and reception, the electronic focusing circuits 12 and 16 are caused to control the focal points at the time of the transmission and reception such that the minimum ultrasonic beam width (i.e., the value of $X_0$) may be the same at the time of the transmission and also at the time of the reception.

It is well known that in order to change the distance $X_0$ of the point of the minimum ultrasonic beam width from the point of wave transmission according to the change of the number of the simultaneously driven transducer elements the focal point may be set as $$F = 1/(1/X_0 - 2\lambda/D^2) \tag{3}$$

as is seen from equation (1).

Meanwhile, while the relation of equation (2) is utilized for generally reducing the width of the ultrasonic beam width at all time according to the change of the number of the simultaneously driven transducer elements, in this case the correction of the focal point is also effected by the electronic focusing circuits 12 and 16.

The afore-mentioned method of determining the focal point is by no means limitative, and the position of the focal point may be suitably adjusted by controlling the delay time of each delay line element in the electronic focusing circuits 12 and 16 to meet the purpose of the diagnosis.

Figure 6:
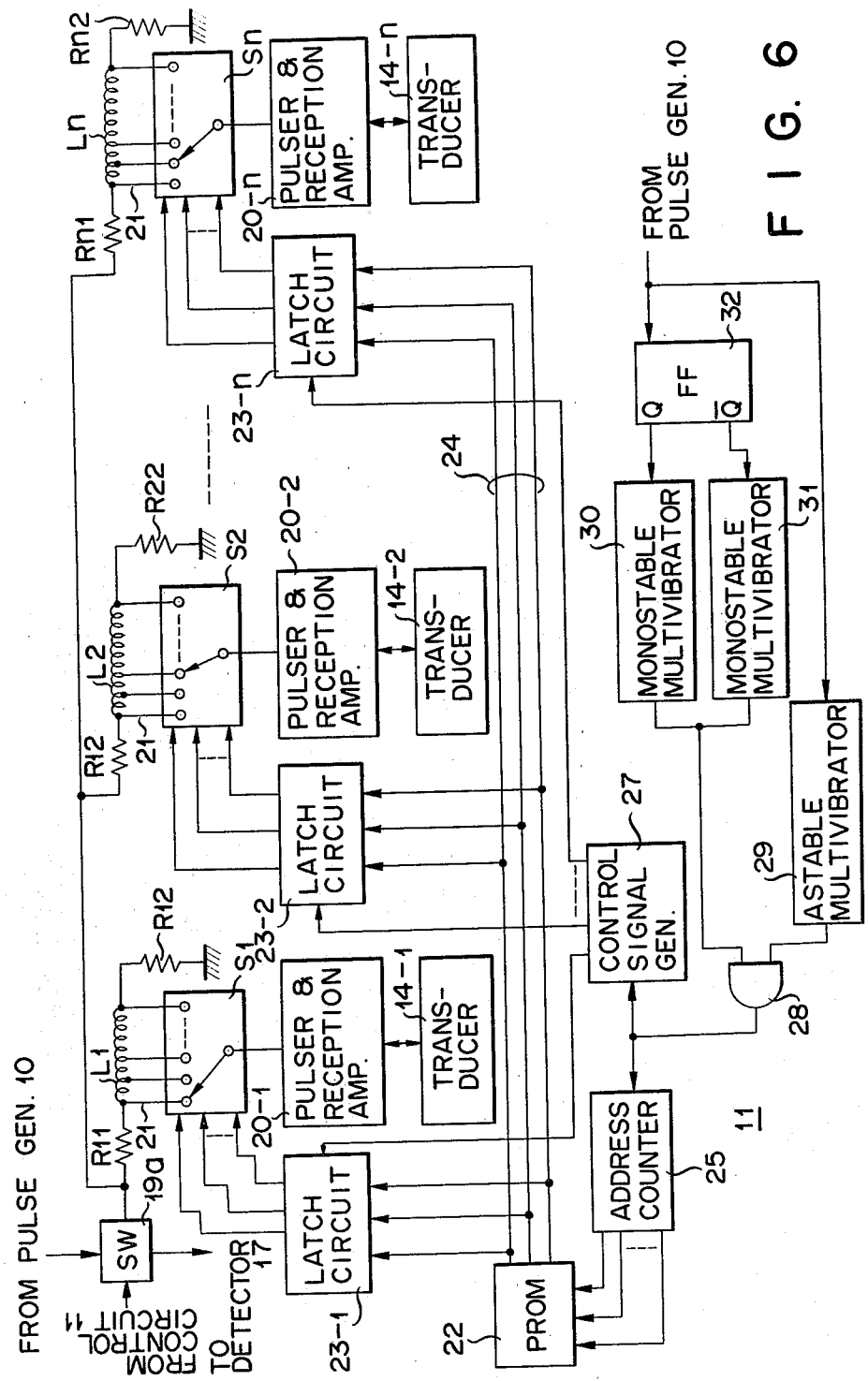
FIG. 6 is a block diagram showing another embodiment of the invention.

A principal part of another embodiment for correcting the variation of the focal point by means of the electronic focusing circuit will now be described with reference to FIG. 6 wherein substantially the same elements as shown in FIG. 5 have identical reference numerals. Since both the transmission and reception side electronic focusing circuits 12 and 16 have entirely the same circuit configurations, an electronic focusing circuit as shown in FIG. 6 is utilized in common both for the transmission and reception of the ultrasonic beam.

The focusing of ultrasonic beams transmitted and received by individual ultrasonic transducer elements 14-1, 14-2, ... 14-n is achieved by controlling the delay time of delay lines L1 to Ln individually connected to the respective transducer elements 14-1, 14-2, ... 14n through respective switch elements S1 to Sn and pulser and reception amplifier circuits 20-1 to 20-n. The delay line elements L1 to Ln are connected to input resistors R11 to Rn1 at the input terminals and to termination resistors R12 to Rn2 at the end of the delay line elements L1 to Ln, respectively. The pulser and reception amplifier circuits 20-1 to 20-n include a transmission and reception switching circuit 19 (not shown in FIG. 6). The control of the delay time is effected by appropriately switching each of the switching elements S1 to Sn to select one of a plurality of taps 21 provided on the delay lines L1 to Ln at a predetermined interval. The switching elements S1 to Sn are connected to a programmable read only memory (PROM) 22 through control lines 24 and latch circuits 23-1, 23-2, ... 23-n. The address of the PROM 22 is designated by an output of an address counter 25 which counts control pulses supplied from an AND circuit 28. One input terminal of the AND circuit 28 is supplied with an output pulse delivered from an astable multivibrator 29. The other input terminal of the AND circuit 28 is supplied with an output of a monostable multivibrator 30 or an output of a monostable multivibrator 31. The output pulse width of the multivibrator 30 is set to correspond to a duration in which eight output pulses are delivered from the astable multivibrator 29. The output pulse width of the multivibrator 31 is set to correspond to a duration in which nine output pulses are delivered from the astable multivibrator 29. The multivibrator 30 is connected to receive a $\bar{Q}$ output of a flip-flop 32 while a Q output terminal of the flip-flop 32 is connected to the input terminal of the multivibrator 31. The flip-flop 32 and the astable monomultivibrator 29 are connected to synchronously receive rate pulses from the system pulse generator 10.

The number of the simultaneously driven transducer elements is selected in response to a latch signal which is supplied sequentially to the latch circuits 23-1 to 23-n from a control signal generator 27 while the control signal generator 27 receive the control pulses sent forth from the astable multivibrator 29 through the AND circuit 28. The delay-time control signal from the PROM 22 for the correction of the focal point is supplied through the control line 24 and the latch circuits 23-1 to 23-n to each of the switching elements S1 to Sn so that the desired tap of the delay lines L1 to Ln may be selected to set focus at the intended point. Under control of the control circuit 11, rate pulses generated at the pulse generator 10 are conducted to the respective delay lines L1 to Ln via a switching circuit 19a and the received echo pulses are conducted from the switching elements S1 to Sn to the detector 17 (FIG. 5) via the switch 19a. The operation of the circuit of FIG. 6 will be described in detail by taking as an example that eight transducer elements are first driven and then nine transducer elements are driven. The delay time data (nanosecond) of each element, when it is driven as one of eight elements and it is driven as one of nine elements, are shown in the following table 1.

TABLE 1

|  | 1 | 2 | 3 | 4 | 5 | 6 | 7 | 8 | 9 |
|---|---|---|---|---|---|---|---|---|---|
| 8 elements | 0 | 88 | 147 | 176 | 176 | 148 | 88 | 0 | |
| 9 elements | 0 | 103 | 176 | 221 | 235 | 221 | 176 | 103 | 0 |

When a first rate pulse is given to the flip-flop 32 the flip-flop 32 is set to deliver a Q output to the multivibrator 30 and an output having a pulse width corresponding to eight control pulses is delivered therefrom. As a result, eight control pulses are sequentially supplied from the AND circuit 28 to the address counter 25 and the control signal generator 27. The address counter 25 produces an address signal of a memory location of the PROM 22 where each of the delay time data is stored, while the control signal generator 27 produces a latch signal for each of the latch circuits 23-1 to 23-8 (not shown). The delay time data thus read out respectively represent delay time of 0 ns, 88 ns, 147 ns, 176 ns, 176 ns, 148 ns, 88 ns and 0 ns as shown in the Table 1. These data are latched in the respective latch circuits 23-1 to 23-8 (not shown) every time a latch signal is delivered from the control signal generator 27. Accordingly, the switching elements S1 to S8 (not shown) are controlled by the delay time data sent forth from the latch circuits 23-1 to 23-8. For example, the pulse signal supplied from the pulse generator 10 to the delay line L2 through the switch 19a is delayed by 88 ns and sent forth to the circuit 20-2 through the switching element S2.

In this manner, the transducers 14-1, 14-2, ... 14-8 (not shown) are driven by the driving pulses having a predetermined phase relationships with each other and an ultrasonic beam having a pattern as shown by the one dash and one dot line in FIG. 3 is transmitted toward an object under examination.

Then, an echo reflected from an object in the field of view is received by the same transducers 14-1 to 14-8 and the echo signals obtained therefrom are conducted to the circuits 20-1 to 20-8 (not shown) now operating as reception amplifiers. The echo signals amplified at the amplifiers 20-1 to 20-8 are conducted through the switching elements S1 to S8 and the switching circuit 19a to the detector 17.

When next rate pulse is supplied to the flip-flop 32, the flip-flop 32 is reset to deliver a $\bar{Q}$ output which is supplied to the monostable multivibrator 31. The output pulse of the multivibrator 31 is sent forth to the AND circuit 28 to obtain nine pulses from the astable multivibrator 29 to both the address counter 25 and the control signal generator 27. In this time, nine delay time data of 0 ns, 103 ns, 176 ns, 221 ns, 235 ns, 221 ns, 176 ns, 103 ns and 0 ns are read out from the PROM 22 sequentially. The delay time data are then latched in the latch circuits 23-1 to 23-9 (not shown) to drive the transducers 14-1 to 14-9 simultaneously.

When third rate pulse is received at the flip-flop 32, the flip-flop 32 is again set to deliver a Q output to the multivibrator 30 and eight delay time data in Table 1 are read out from the PROM 22. The data first read out from the PROM 22 are latched in the latch circuit 23-2 and second to eighth data are latched in the latch circuits 23-3 to 23-9 in response the latch signals sent forth from the control signal generator 27.

When fourth rate pulse is supplied to the flip-flop 32, the $\overline{Q}$ output is sent forth to the multivibrator 31 to deliver nine pulses to the address counter 25. As a result, nine delay time data in Table 1 are read out from the PROM 22 and latched at the second to tenth latch circuits 23-2 to 23-10 (not shown) under the control of the control signal generator 27.

In the above way, the control signal generator 27 selects the number of the simultaneously driven transducer elements and supplied control signals for driving these elements to the pulser and reception amplifier circuits 20-1 to 20-n, thus effecting the correction of the focal point according to the number of the simultaneously driven transducer elements.

Table 2 below represents an example of delay time data (ns) in which a group of fourteen and fifteen transducer elements are alternately driven.

TABLE 2

| | 1 | 2 | 3 | 4 | 5 | 6 | 7 | 8 | 9 |
|---|---|---|---|---|---|---|---|---|---|
| 14 elements | 0 | 126 | 231 | 315 | 378 | 420 | 441 | 441 | 420 |
| 15 elements | 0 | 137 | 252 | 347 | 420 | 473 | 504 | 515 | 504 |
| | | | 10 | 11 | 12 | 13 | 14 | 15 | |
| | | | 378 | 315 | 231 | 126 | 0 | | |
| | | | 473 | 420 | 347 | 252 | 137 | 0 | |

In this case the circuit of FIG. 6 may be applied by merely varying the output pulse widths of the multivibrators 30 and 31 for obtaining fourteen and fifteen pulses from the AND gate 28 and storing the data of Table 2 in the PROM 22.

Further, it is possible to use surface wave delay elements or charge coupled devices as delay elements in lieu of the afore-mentioned delay lines. When using the charge coupled devices, both the delay lines L1 to Ln and associated switching elements S1 to Sn shown in FIG. 6 may be replaced by them.

What we claim is:

1. An ultrasonic diagnosis apparatus comprising:
    a plurality of transducer elements arranged at least in a row,
    means for generating a system pulse signal,
    means for controlling the number of simultaneously driven transducer elements,
    said controlling means including means for storing delay time data for said simultaneously driven transducer elements to maintain the minimum width position of ultrasonic beams which said simultaneously driven transducer elements transmit toward and receive from an object under examination substantially constant irrespective of the change of the number of said simultaneously driven transducer elements, electronic focusing means including delay elements for adjusting the focal point of the ultrasonic beams in accordance with the delay time data read out from said storing means in order for the minimum width position of the ultrsonic beams to be substantially constant,
    means for providing said simultaneously driven transducer elements with an output of said electronic focusing means,
    means for detecting the ultrasonic beams received by said simultaneously driven transducer elements, and
    means for displaying the detected ultrasonic beams in response to the system pulse.

2. The ultrasonic diagnosis apparatus according to claim 1, wherein said electronic focusing means includes delay elements with a plurality of taps, and switching elements serving to switch said taps of each said delay element in response to the delay time data read out from said storing means.

3. The ultrasonic diagnosis apparatus according to claim 1, wherein said electronic focusing means includes a first electronic focusing circuit for determining the focal point of a transmitted ultrasonic beam and a second focusing circuit for determining the focal point of a received ultrasonic beam.

4. The ultrasonic diagnosis apparatus according to claim 1, wherein said controlling means includes a programmable read only memory for storing at least first and second groups of delay time data, means for temporarily storing the delay time data, memory access control means for reading out from said programmable read only memory said first and second groups of delay time data alternately, and means for successively distributing said read out first and second groups of delay time data to the selected numbers of the transducer elements.

5. The ultrasonic diagnosis apparatus according to claim 1, wherein said controlling means includes a flip-flop for alternately producing Q and $\overline{Q}$ outputs in response to received system pulse, a first monostable multivibrator for generating a first gating pulse having a first pulse width, a second monostable multivibrator for generating a second gating pulse having a second pulse width, an astable multivibrator for generating a series of pulses, means for gating a predetermined number of said pulses produced from said astable multivibrator in accordance with the pulse widths of said first and second gating pulses, the number of first group pulses derived from said gating means in response to the first gating pulse being smaller than that of second group pulses derived from said gating means in response to the second gating pulse, an address counter for counting pulses obtained from said gating means, a programmable read only memory addressed by an output of said address counter and storing delay time data for determining delay times of said delay elements, latch circuit means for latching the delay time data read out from the programmable read only memory, a control signal generator connected to receive the output pulses of said gating means and to produce control signals for controlling said latch circuit means, and switching elements for determining delay times of said delay elements according to the delay time data latched in said latch circuit means.

* * * * *